US008547812B2

(12) United States Patent
Kuwajima

(10) Patent No.: US 8,547,812 B2
(45) Date of Patent: Oct. 1, 2013

(54) OPTICAL DISC DEVICE AND METHOD FOR SETTING PLAYBACK POWER OF OPTICAL DISC DEVICE

(75) Inventor: Mamoru Kuwajima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/455,358

(22) Filed: Apr. 25, 2012

(65) Prior Publication Data

US 2012/0314554 A1 Dec. 13, 2012

(30) Foreign Application Priority Data

Jun. 10, 2011 (JP) ................................ 2011-130332

(51) Int. Cl.
*G11B 7/00* (2006.01)

(52) U.S. Cl.
USPC .................... 369/53.23; 369/53.22; 369/53.2; 369/53.28; 369/44.25

(58) Field of Classification Search
None
See application file for complete search history.

(56) References Cited

U.S. PATENT DOCUMENTS

| | | | | |
|---|---|---|---|---|
| 6,747,931 | B1 * | 6/2004 | Park | 369/53.23 |
| 2004/0213099 | A1 * | 10/2004 | Lee | 369/44.27 |
| 2008/0247291 | A1 * | 10/2008 | Kawaguchi | 369/53.23 |

FOREIGN PATENT DOCUMENTS

| | | |
|---|---|---|
| JP | 2003-257072 | 9/2003 |
| JP | 2007-265596 A | 10/2007 |
| JP | 2009-140580 | 6/2009 |
| JP | 2010-160864 | 7/2010 |
| JP | 2010-160864 A | 7/2010 |
| JP | 2010-186545 | 8/2010 |

OTHER PUBLICATIONS

Japanese Office Action dated Apr. 16, 2013.

* cited by examiner

*Primary Examiner* — Muhammad N Edun
(74) *Attorney, Agent, or Firm* — Morgan, Lewis & Bockius LLP

(57) ABSTRACT

A focus search is performed on a mounted optical-disc recording medium once the optical-disc recording medium has been mounted in an optical disc device. The type of the mounted optical-disc recording medium is determined on the basis of results of the focus search. When a determination has been made that the mounted optical-disc recording medium is a multilayer optical-disc recording medium having three or more recording layers, a playback power is for an optical-disc recording medium being of a specification identical to the multilayer optical-disc recording medium and having one or two recording layers. A playback operation at the set playback power is used to read optical disc information from the mounted optical-disc recording medium, the optical disc information indicating the type of the mounted optical-disc recording medium.

7 Claims, 3 Drawing Sheets

OPTICAL DISC DEVICE AND METHOD FOR SETTING PLAYBACK POWER OF OPTICAL DISC DEVICE

This application is based upon and claims the benefit of priority from the corresponding Japanese Patent Application No. 2011-130332, filed Jun. 10, 2011, the entire contents of which are incorporated herein by reference.

BACKGROUND OF THE INVENTION

1. Field of the Invention

The present invention relates to an optical disc device for performing playback operations on optical-disc recording media, and particularly relates to a method for setting the playback power of the optical disc device.

2. Description of Related Art

Compact discs (CDs), digital versatile discs (DVDs), Blu-ray discs (BDs;®), and other optical-disc recording media are currently in widespread use. These optical-disc recording media have one or two recording layers, but multilayer optical-disc recording media having three or more recording layers in order to further expand memory capacity are also being put into use. (In order to differentiate from optical-disc recording media having one or two layers, only optical-disc recording media having three or more recording layers will be referred to as "multilayer optical-disc recording media" below.) For example, in the case of BDs, BDXLs® having three to eight recording layers are being standardized, and BDTLs having three recording layers and BDQLs having four recording layers are being put into use.

For example, Japanese Laid-Open Patent Application No. 2010-186545 discloses a multilayer optical-disc recording medium having seven recording layers capable of recording playback and one recording layer specialized for playback. Japanese Laid-Open Patent Application No. 2010-160864 describes an optical-disc recording medium having n recording layers (where n=2 to 8). Japanese Laid-Open Patent Application No. 2009-140580 describes an optical-disc recording medium having two or three or more recording layers. Japanese Laid-Open Patent Application No. 2003-257072 describes the development of an optical-disc recording medium having a plurality of recording layers.

However, greater optical output is required for multilayer optical-disc recording media having three or more recording layers than for conventional optical-disc recording media having one or two recording layers. Therefore, when the optical-disc recording medium is mounted in an optical disc device, when an optical-disc recording medium having one or two recording layers is erroneously determined to be a multilayer optical-disc recording medium having three or more recording layers, the optical output may be set excessively high. In such instances, the optical-disc recording medium is degraded or destroyed by the optical output (i.e., the playback power) during playback operations.

For example, in BDs, the reflectivity of the recording surface is lower than in CDs, DVDs, and the like, and the protective layer on the recording surface is extremely thin. Even when the mounted optical-disc recording medium is BDSL or BDDL, the medium may be readily mistaken for BDXL due to undulations or warping of the BD, focusing errors, or other issues. When playback operations are performed on the BDSL or BDDL, and the playback power is set for BDXL, the BDSL or BDDL will be degraded or destroyed.

Japanese Laid-Open Patent Application No. 2010-186545 merely discloses that the playback power for the recording layer that allows recording and playback is set when playing back the address information of the optical-disc recording medium. Japanese Laid-Open Patent Application No. 2010-160864 discloses a method for determining the number of recording layers in a multilayer optical-disc recording medium, but a process for cases where the number of recording layers of the multilayer optical-disc recording media is erroneously determined is not described. The aforedescribed problem therefore cannot be resolved. Japanese Laid-Open Patent Application No. 2009-140580 sets the playback power to a standard playback power and then obtains an optimal playback power for the multilayer optical-disc recording medium on the basis of the amount of change in a jitter value measured while changing the playback power by predetermined amounts. However, the only standard playback power described is a low power that is susceptible to the effects of laser noise. Japanese Laid-Open Patent Application No. 2003-257072 merely discloses setting playback power and recording power on the basis of the results of determining whether the optical-disc recording medium has one recording layer or two recording layers.

Thus, even in Japanese Laid-Open Patent Application No. 2010-186545, Japanese Laid-Open Patent Application No. 2010-160864, Japanese Laid-Open Patent Application No. 2009-140580, and Japanese Laid-Open Patent Application No. 2003-257072, when an optical-disc recording medium having one or two recording layers is erroneously determined to be a multilayer optical-disc recording medium having three or more recording layers, the playback power will cause the optical-disc recording medium to be degraded or destroyed.

SUMMARY OF THE INVENTION

The present invention was devised in light of the aforedescribed problems, and it is an object thereof to provide an optical disc device and a method for setting the playback power of the optical disc device that can prevent degradation or destruction of the optical-disc recording medium due to the playback power when an optical-disc recording medium is mounted in the optical disc device, even in cases where an optical-disc recording medium having one or two recording layers is erroneously determined to be a multilayer optical-disc recording medium having three or more memory layers.

In order to achieve the aforedescribed object, an optical disc device according to an aspect of the present invention comprises an optical pickup part for performing a focus search on an optical-disc recording medium once the optical-disc recording medium has been mounted in the optical disc device; a determination circuit part for determining a type of the mounted optical-disc recording medium on the basis of results of the focus search; an optical-output-setting circuit part for setting in the optical pickup part, when the determination circuit part has determined that the mounted optical-disc recording medium is a multilayer optical-disc recording medium having three or more recording layers, a playback power for an optical-disc recording medium being of a specification identical to the multilayer optical-disc recording medium and having one or two recording layers; and a playback-controlling circuit part for using a playback operation at the playback power set by the optical-output-setting circuit part to read optical disc information from the mounted optical-disc recording medium, the optical disc information indicating the type of the mounted optical-disc recording medium.

According to the aforedescribed configuration, when an optical-disc recording medium is mounted in an optical disc device, the type of the optical-disc recording medium is determined on the basis of the results of a focus search. When a determination of a multilayer optical-disc recording medium having three or more recording layers has been made, playback power is set for an optical-disc recording medium having one or two recording layers and having a specification identical to the multilayer optical-disc recording medium having three or more layers. A playback operation at the set playback power is used to read optical disc information from the optical-disc recording medium, the optical disc information indicating the type of the mounted optical-disc recording medium. Degradation or destruction of the optical-disc recording medium resulting from playback power can thus be prevented when the optical-disc recording medium has been mounted in the optical disc device, even in cases where an optical-disc recording medium having one or two recording layers is erroneously determined to be a multilayer optical-disc recording medium having three or more memory layers.

The aforedescribed configuration may be such that, when the playback-controlling circuit part has read the optical disc information, the optical-output-setting circuit part switches the playback power of the optical pickup part to a playback power corresponding to the type of the mounted optical-disc recording medium, the type being indicated by the optical disc information.

The aforedescribed configuration may further be such that the optical-output-setting circuit part switches the playback power of the optical pickup part to the playback power corresponding to the type of the mounted optical-disc recording medium, and then adjusts parameters according to the playback power, the type of the optical-disc recording medium being indicated by the optical disc information, and the parameters being the parameters necessary for controlling optical output of the optical pickup part.

The aforedescribed configuration may also be such that the mounted optical-disc recording medium is a Blu-ray disc.

In order to achieve the aforedescribed object, a method for setting a playback power of an optical disc device according to an aspect of the present invention comprises a step for performing a focus search on an optical-disc recording medium, once the optical-disc recording medium has been mounted in the optical disc device; a step for determining a type of the mounted optical-disc recording medium on the basis of results of the focus search; a step for, for setting, when a determination has been made in the determination step that the mounted optical-disc recording medium is a multilayer optical-disc recording medium having three or more recording layers, a playback power for an optical-disc recording medium being of a specification identical to the multilayer optical-disc recording medium and having one or two recording layers; and a step for using a playback operation at the playback power set in the setting step to read optical disc information from the mounted optical-disc recording medium, the optical disc information indicating the type of the mounted optical-disc recording medium.

According to the aforedescribed configuration, when an optical-disc recording medium is mounted in an optical disc device, the type of the optical-disc recording medium is determined on the basis of the results of a focus search. When a determination of a multilayer optical-disc recording medium having three or more recording layers has been made, playback power is set for an optical-disc recording medium having one or two recording layers and having a specification identical to the multilayer optical-disc recording medium having three or more layers. A playback operation at the set playback power is used to read optical disc information from the optical-disc recording medium, the optical disc information indicating the type of the mounted optical-disc recording medium. Degradation or destruction of the optical-disc recording medium resulting from playback power can thus be prevented when the optical-disc recording medium has been mounted in the optical disc device, even in cases where an optical-disc recording medium having one or two recording layers is erroneously determined to be a multilayer optical-disc recording medium having three or more memory layers.

DETAILED DESCRIPTION OF PREFERRED EMBODIMENTS

Embodiments of the present invention will be described below with reference to the drawings.

An optical disc device 1 in which the present invention is applied is, e.g., a BD player. The optical disc device 1, e.g., writes (records) and reads (plays back) information with respect to a Blu-ray disc (BD;®) or other optical disc 2 that can be inserted and retracted. The optical disc 2 that corresponds to the optical disc device 1 is an optical-disc recording medium, which includes at least BDXL®, BDSL, BDDL, or another BD. BDXL is a BD having three or more recording layers (a multilayer optical-disc recording medium having three or more recording layers). BDSL is a BD having a single recording layer. BDDL is a BD having two recording layers. The optical disc 2 corresponding to the optical disc device 1 also includes digital versatile discs (DVDs), compact discs (CDs), and other optical-disc recording media, but the optical disc 2 is not particularly limited to these examples.

Figure 1:
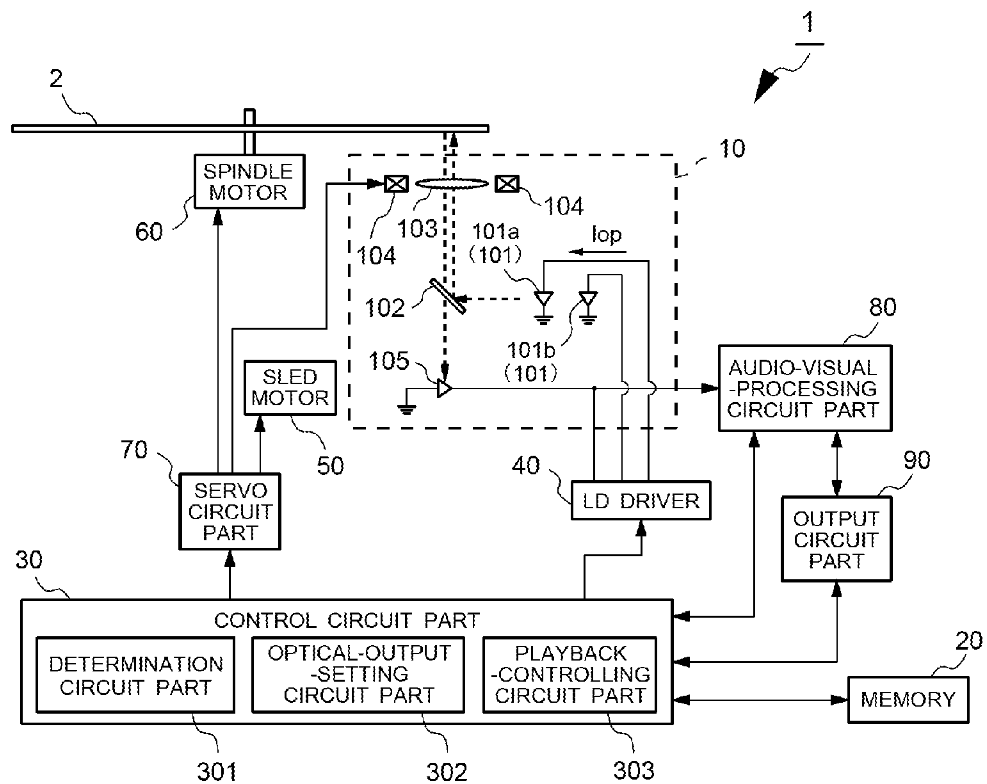
FIG. 1 is configuration diagram of an optical disc device in which the present invention is applied.

FIG. 1 is a configuration diagram of an optical disc device in which the present invention is applied. The optical disc device 1 is provided with an optical pickup part 10, a memory 20 (memory part), a control circuit part 30, an LD driver 40, a sled motor 50, a spindle motor 60, a servo circuit part 70, an audio-visual-processing circuit part 80, and an output circuit part 90, as shown in FIG. 1. The optical disc device 1 may also be provided with an HDD (hard disc drive) or other memory device.

When the optical disc 2 is mounted in the optical disc device 1, the optical pickup part 10 performs a focus search on the optical disc 2. The optical pickup part 10 reads (records) or writes (plays back) data with respect to the mounted optical disc 2. The optical pickup part 10 has a laser diode 101, a beam splitter 102, an objective lens 103, an actuator 104, and a photodiode 105. The laser diode will be referred to as an "LD" below. The photodiode will be referred to as a "PD."

The LD 101 is a semiconductor laser element for emitting laser light having a strength corresponding to driving power supplied from the LD driver 40. The LD 101 has a first LD 101*a* for emitting laser light for BDs and a second LD 101*b* for emitting laser light for DVDs. The LD 101 may also have a third LD for emitting laser light for CDs. A constant rated voltage is applied to the LD 101. The optical output of laser light of the LD 101 is therefore in actuality controlled by a driving current Top supplied from the LD driver 40.

The beam splitter 102 guides laser light emitted from the LD 101 to the recording surface of the optical disc 2 mounted in the optical disc device 1. The beam splitter 102 also guides laser light that has been reflected by the recording surface of the optical disc 2 (referred to as "reflected light" below) to the PD 105.

The objective lens 103 focuses the laser light incident on the recording surface of the optical disc 2 and uses the laser light to form optical spots on the recording surface of the 2.

The actuator 104 performs focus searches, tracking adjustments, and the like, and therefore the objective lens 103 is driven in a focusing direction (a direction substantially perpendicular to the recording surface of the optical disc 2) and a tracking direction (the radial direction of the optical disc 2) on the basis of control signals outputted from the servo circuit part 70.

The PD 105 performs a photoelectric conversion on the received reflected light generates an electric-current signal having a magnitude that corresponds to the strength of the reflected light. The electric-current signal generated by the PD 105 may also be converted by a predetermined converting circuit to an electrical-voltage signal that corresponds to the magnitude of the electric-current signal. In any case, a photoelectric conversion signal (the electric-current signal or the electric-voltage signal) having a magnitude corresponding to the strength of the reflected light is generated by the optical pickup part 10. The photoelectric conversion signal represents the strength of the reflected light. Therefore, the photoelectric conversion signal contains information concerning the optical output of the laser light emitted from the LD 101 in addition to containing information written to or read from the optical disc 2. The optical disc device 1 accordingly also makes use of the photoelectric conversion signal as a control signal for performing feedback control on the optical output of the laser light emitted by the LD 101. The photoelectric conversion signal outputted from the PD 105 is therefore outputted to the LD driver 40 and the audio-visual-processing circuit part 80.

The memory 20 is a non-volatile recording medium. The memory 20 stores, e.g., control information and programs used by the control circuit part 30, and information read from the optical disc 2 (e.g., physical information including optical disc information and the like). The control information includes optical output data tables, switching information, and other data. The physical characteristics of the optical disc 2 (e.g., reflectivity and the like), focus search conditions (time required for the focus search, etc.), set values for the optical output (e.g., playback power and recording power) of the laser light of the LD 101, set values for the driving power (the driving voltage and the driving current Iop) supplied to the LD 101, and the like are set in advance in the optical output data tables in relation to the type of the optical disc 2. The switching information indicates whether the playback power (i.e., the optical output of the LD 101 during playback operations) of the optical pickup part 10 has completed switching to the playback power for BDXL. The optical disc information is management information that indicates the type of the optical disc 2 and other information. The optical disc information is included in the physical information stored in the inner circumferential region of the optical disc 2 (e.g., the PIC region of a BD). The memory 20 also stores content data generated by the audio-visual-processing circuit part 80, data inputted from or outputted to the output circuit part 90, and other data.

The control circuit part 30 uses the control information and programs stored in the memory 20 and controls the various parts of the optical disc device 1. The control circuit part 30 has a determination circuit part 301, an optical-output-setting circuit part 302, and a playback-controlling circuit part 303.

The determination circuit part 301 determines the type of the optical disc 2 on the basis of the results of the focus search. The "type" of the optical disc 2 refers to the specification of the optical disc 2 (e.g., CD, DVD, BD); the number of recording layers of the optical disc 2; whether the optical disc 2 corresponds to playback only, write-once recording and playback, or rewritable recording and playback; and other such information.

The optical-output-setting circuit part 302 makes reference to the optical output data tables stored in the memory 20 and sets the voltage value of the driving voltage according to the type of the optical disc 2, where the driving voltage is supplied to the LD 101 by the LD driver 40. The optical-output-setting circuit part 302 outputs to the LD driver 40 a light-emission control signal for controlling the optical output of the LD 101 according to the set voltage value of the driving power, and the stopping and starting of light emission of the LD 101 (i.e., whether or not the driving power is supplied to the LD 101). The optical-output-setting circuit part 302 outputs the light-emission control signal to the LD driver 40. The light-emission control signal controls the optical output of the LD 101 according to the voltage values of the driving power, and the stopping and starting of light emission of the LD 101 (i.e., whether or not the driving power is supplied to the LD 101). A driving voltage having a constant value is applied to the LD 101, and therefore the optical output of the LD 101 is actually controlled by the driving current Top supplied to the LD 101. The optical-output-setting circuit part 302 therefore sets the current value of the driving current Top, which the LD driver 40 supplies to the LD 101, according to the type of the optical disc 2.

When the determination circuit part 301 determines that the optical disc 2 is a BDXL having three or more recording layers, the optical-output-setting circuit part 302 sets the playback power in the optical pickup part 10 for BDSL or BDDL, which are the same type as BDXL. The optical-output-setting circuit part 302 further reads the switching information from the memory 20 and sets the fact that the playback power of the optical pickup part 10 has not completed switching to BDXL playback power as the switching information. The optical-output-setting circuit part 302 stores the set switching information by overwriting the memory 20.

When the playback-controlling circuit part 303 reads the optical disc information, the optical-output-setting circuit part 302 switches the playback power of the optical pickup part 10 to a playback power that corresponds to the type of the optical disc 2 as indicated by the optical disc information. The optical-output-setting circuit part 302 further references the switching information stored in the memory 20 at this time. When the switching information indicates that the playback power of the optical pickup part 10 has not completed switching to BDXL playback power, the optical-output-setting circuit part 302 sets BDXL playback power in the optical pickup part 10. The optical-output-setting circuit part 302 then sets the switching information to "switching complete" and stores the set switching information by overwriting the memory 20.

When the optical disc 2 is mounted in the optical disc device 1, the playback-controlling circuit part 303 uses a playback operation at the playback power set by the optical-output-setting circuit part 302 to read from the optical disc 2 the physical information that includes the optical disc information that indicates the type of the optical disc 2.

The LD driver 40 is a light-emission-controlling circuit part for controlling the stopping and starting of light emission of the LD 101 on the basis of the light-emission control signal inputted from the optical-output-setting circuit part 302. The LD driver 40 applies a constant driving voltage to the LD 101.

The LD driver 40 controls the current value of the driving current Top, which is supplied to the LD 101, in order to control the optical output of the LD 101. The LD driver 40 has APC (automatic power control) functionality for performing feedback control on the optical output of the LD 101. The LD driver 40 performs feedback control on the current value of the driving current Top, which is supplied to the LD 101, on the basis of the photoelectric conversion signal inputted from the PD 105 so that the optical output (e.g., the recording power and playback power) of the laser light emitted from the LD 101 does not fluctuate.

The sled motor 50 is a driving part for moving the optical pickup part 10 in the radial direction of the optical disc 2 on the basis of a control signal outputted from the servo circuit part 70. The spindle motor 60 is a driving part for causing the optical disc 2 to rotate on the basis of a control signal outputted from the servo circuit part 70. The servo circuit part 70 controls the driving of the actuator 104 within the optical pickup part 10, the sled motor 50, and the spindle motor 60 on the basis of a control signal inputted from the control circuit part 30.

The audio-visual-processing circuit part 80 performs a variety of processes (demodulation and the like) on the photoelectric conversion signal and generates various content data (e.g., video data, audio data, text data, and the like) on the basis of the photoelectric conversion signal. The audio-visual-processing circuit part 80 outputs the content data thus generated to the output circuit part 90 as, e.g., a video signal and an audio signal. The output circuit part 90 is an interface that has an externally connected terminal The output circuit part 90 outputs and receives inputs of video signals, audio signals, and control signals with respect to an external device.

[First Embodiment]

Figure 2:
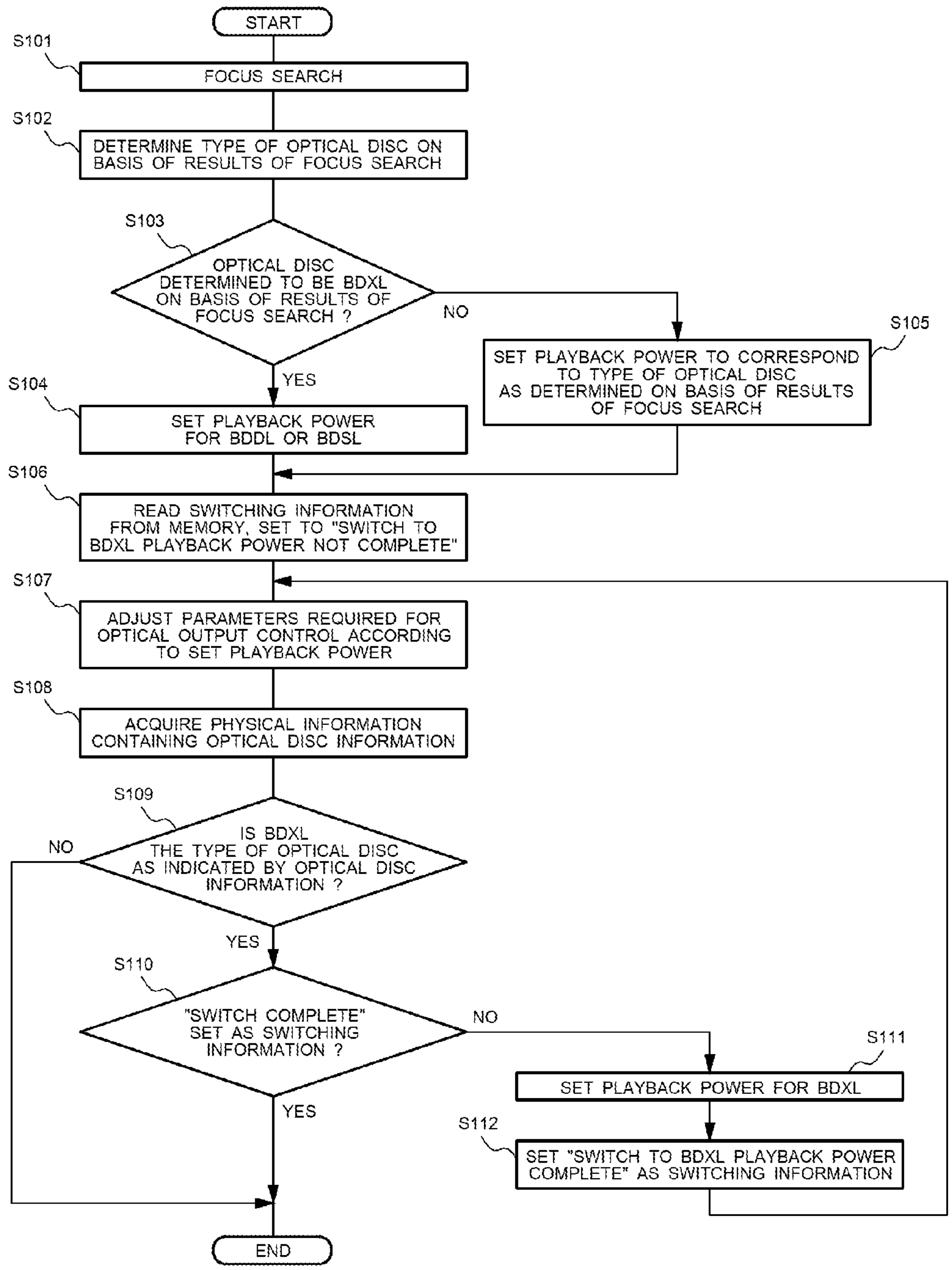
FIG. 2 is a flow chart that shows a first embodiment of a method for setting the playback power of the optical disc device.

A first embodiment of a method for using the optical disc device 1 to set the playback power in the optical pickup part 10 when the optical disc 2 is mounted in the optical disc device 1 will be described next. FIG. 2 is a flow chart that shows the first embodiment of the method for setting the playback power of the optical disc device.

First, when the optical disc 2 is mounted in the optical disc device 1, the optical pickup part 10 performs a focus search on the optical disc 2 (step S101). The optical output of the LD 101 is set at this time to the optical output determined in advance by the optical-output-setting circuit part 302. This optical output should allow the focus search to be properly performed on at least the first recording layer (the so-called “layer 0”) of the optical disc 2 but is otherwise not particularly limited.

The determination circuit part 301 next determines the type of the optical disc 2 on the basis of the results of the focus search (step S102). The determination circuit part 301 detects, e.g., the reflectivity of the optical disc 2 during the focus search and the number of S curves in the focus error signal. The determination circuit part 301 makes reference to the optical output data tables and determines the type of the optical disc 2. Alternatively, the determination circuit part 301 may make reference to the optical output data tables and determine the type of the optical disc 2 from the time necessary for the focus search. The structure (e.g., thickness of the protective layer on the recording surface) and optical characteristics (reflectivity at the recording surface, and other characteristics) of the optical disc 2 will vary greatly depending on the specification (e.g., CD, DVD, BD) of the optical disc 2. Even when the specification of the optical disc 2 is the same, the structure and optical characteristics of the optical disc 2 vary depending on the format. In the case of, e.g., BDs, playback-only BD-ROMs, write-once BD-Rs, and rewritable BD-REs have different reflectivity of the recording surface, and may differ in other characteristics. BDSL, BDDL, and BDXL differ greatly in the thickness of the protective layer on the recording surface. Therefore, reference is made to the optical output data tables, and the reflectivity detected during the focus search, the number of S curves in the focus error signal, the time required for the focus search, and other factor are compared, whereby the type of the optical disc 2 can be roughly determined.

When a determination has been made on the basis of the results of the focus search that the optical disc 2 is a BDXL having three or more recording layers (“Yes” in step S103), the optical-output-setting circuit part 302 makes reference to the optical output data tables and sets the playback power of the optical pickup part 10 to match an optical-disc recording medium of the same specification as BDXL (BD in this case) and being a BDSL or BDDL having one or two recording layers (step S104). Degradation or destruction of the optical disc 2 resulting from playback power can thus be prevented when the optical disc 2 has been mounted in the optical disc device 1, despite the optical disc 2 being an optical-disc recording medium other than BDXL, which has three or more memory layers, even in cases where the optical disc 2 is erroneously determined to be BDXL.

On the other hand, when a determination has been made on the basis of the results of the focus search that the optical disc 2 is not a BDXL having three or more recording layers (“No” in step S103), the optical-output-setting circuit part 302 makes reference to the optical output data tables and sets the playback power of the optical pickup part 10 to correspond to the type of the optical disc 2 as determined in step S102 (step S105). In cases where, e.g., the optical disc 2 was determined to be BDSL on the basis of the results of the focus search in step S102, the optical-output-setting circuit part 302 sets the playback power for BDSL.

The optical-output-setting circuit part 302 reads the switching information from the memory 20, sets the fact that the playback power of the optical pickup part 10 has not completed switching to the playback power for BDXL as the switching information, and stores this switching information by overwriting the memory 20 (step S106). The optical-output-setting circuit part 302 then makes reference to the optical output data tables stored in the memory 20 and adjusts the parameters (e.g., servo gain, RF signal level) required to control the optical output of the LD 101 according to the playback power (step S107).

The playback-controlling circuit part 303 next uses the playback operation performed at the playback power set by the optical-output-setting circuit part 302 to read the physical information from the inner circumferential region of the optical disc 2 (e.g., the PIC region of a BD) (step S108). Optical disc information that indicates the management information of the optical disc 2 (e.g., the type of the optical disc 2) is included in the acquired physical information.

The determination circuit part 301 determines whether or not the type of the optical disc 2 as indicated by the optical disc information is BDXL (step S109). In cases where a determination is made that the optical disc 2 is not BDXL (“No” in step S109), the control circuit part 30 ends the process. Before the control circuit part 30 ends the process, the optical-output-setting circuit part 302 may once again set in the optical pickup part 10 the playback power that corresponds to the type of the optical disc 2 as indicated by the optical disc information.

In cases where a determination has been made that the optical disc 2 is BDXL (“Yes” in step S109), the determination circuit part 301 further makes reference to the switching information stored in the memory 20 and determines whether or not the fact that the playback power of the optical pickup part 10 has completed switching to BDXL playback power has been set as the switching information (step S110). In cases where a determination is made that the switch to BDXL playback power has completed ("Yes" in step S110), the control circuit part 30 ends the process.

In cases where a determination is made that the switch to BDXL playback power has not completed ("No" in step S110), the optical-output-setting circuit part 302 sets the playback power for BDXL in the optical pickup part 10. The optical-output-setting circuit part 302 further sets the switching information to indicate that switching is complete and stores this switching information by overwriting the memory 20 (step S112). The control circuit part 30 then returns the process to step S107.

[Second Embodiment]

Figure 3:
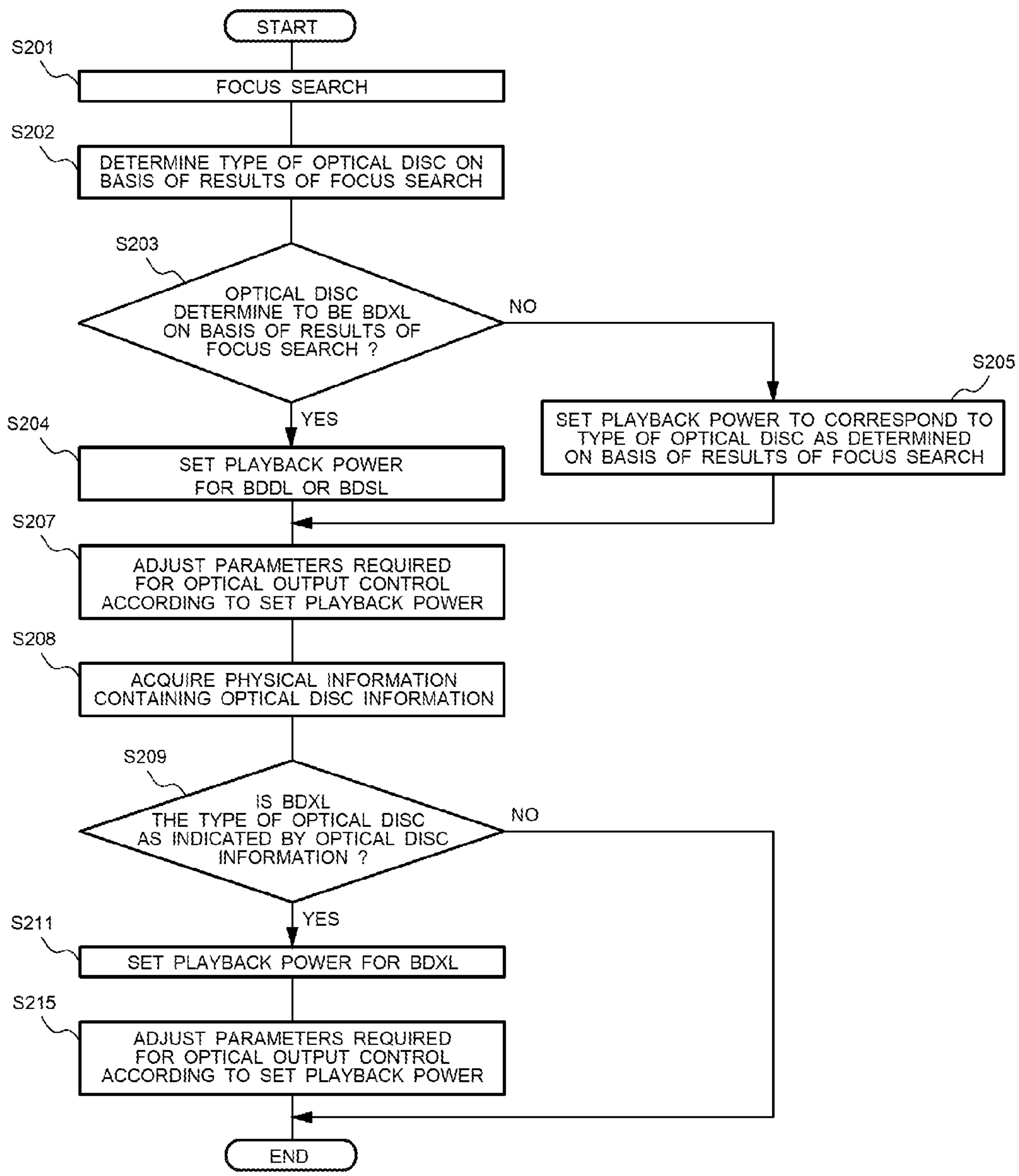
FIG. 3 is a flow chart that shows a second embodiment of a method for setting the playback power of the optical disc device.

A second embodiment of a method for using the optical disc device 1 to set the playback power in the optical pickup part 10 when the optical disc 2 is mounted in the optical disc device 1 will be described next. FIG. 3 is a flow chart that shows the second embodiment of the method for setting the playback power of the optical disc device. The switching information stored in the memory 20 is not used in the second embodiment. In the second embodiment, in cases where a determination has been made that the type of the optical disc 2 is BDXL, as indicated by the optical disc information read from the optical disc 2, BDXL playback power is set in the optical pickup part 10. Once the parameters (e.g., servo gain and RF signal level) necessary for optical output control of the LD 101 have been adjusted according to the set playback power, the process ends. Otherwise, the optical disc device 1 of the second embodiment operates in the same manner as in the first embodiment.

First, when the optical disc 2 is mounted in the optical disc device 1, the optical pickup part 10 performs a focus search on the optical disc 2 (step S201). The determination circuit part 301 next determines the type of the optical disc 2 on the basis of the results of the focus search (step S202).

When a determination has been made on the basis of the results of the focus search that the optical disc 2 is a BDXL having three or more recording layers ("Yes" in step S203), the optical-output-setting circuit part 302 makes reference to the optical output data tables and sets the playback power of the optical pickup part 10 to match an optical-disc recording medium of the same specification as BDXL (BD in this case) and being a BDSL or BDDL having one or two recording layers (step S204). Degradation or destruction of the optical disc 2 resulting from playback power can thus be prevented when the optical disc 2 has been mounted in the optical disc device 1, despite the optical disc 2 being an optical-disc recording medium other than BDXL, which has three or more memory layers, even in cases where the optical disc 2 is erroneously determined to be BDXL.

On the other hand, when a determination has been made on the basis of the results of the focus search that the optical disc 2 is not a BDXL having three or more recording layers ("No" in step S203), the optical-output-setting circuit part 302 makes reference to the optical output data tables and sets the playback power of the optical pickup part 10 to correspond to the type of the optical disc 2 as determined in step S202 (step S205).

The optical-output-setting circuit part 302 then makes reference to the optical output data tables stored in the memory 20 and adjusts the parameters (e.g., servo gain, RF signal level) required to control the optical output of the LD 101 according to the set playback power (step S207). The playback-controlling circuit part 303 uses the playback operation performed at the playback power set by the optical-output-setting circuit part 302 to read the physical information from the inner circumferential region of the optical disc 2 (e.g., the PIC region of a BD) (step S208).

The determination circuit part 301 determines whether or not the type of the optical disc 2 as indicated by the optical disc information is BDXL (step S209). In cases where a determination is made that the optical disc 2 is not BDXL ("No" in step S209), the control circuit part 30 ends the process. Before the control circuit part 30 ends the process, the optical-output-setting circuit part 302 may once again set in the optical pickup part 10 the playback power that corresponds to the type of the optical disc 2 as indicated by the optical disc information.

In cases where a determination has been made that the optical disc 2 is BDXL ("Yes" in step S209), the optical-output-setting circuit part 302 sets the playback power for BDXL in the optical pickup part 10 (step S212). The optical-output-setting circuit part 302 then makes reference to the optical output data tables stored in the memory 20 and adjusts the parameters (e.g., servo gain, RF signal level) required to control the optical output of the LD 101 according to the set playback power (step S215). The control circuit part 30 then ends the process.

The present invention was described above on the basis of embodiments. These embodiments are given by way of example. Various modifications in the combinations of configurational elements and processes are possible, and it shall be apparent to a person of ordinary skill in the art that these modifications fall within the scope of the present invention.

What is claimed is:

1. An optical disc device, comprising:

an optical pickup part for performing a focus search on an optical-disc recording medium once the optical-disc recording medium has been mounted in the optical disc device;

a determination circuit part for determining a type of the mounted optical-disc recording medium on the basis of results of the focus search;

an optical-output-setting circuit part for setting in the optical pickup part, when the determination circuit part has determined that the mounted optical-disc recording medium is a multilayer optical-disc recording medium having three or more recording layers, a playback power for an optical-disc recording medium being of a specification identical to the multilayer optical-disc recording medium and having one or two recording layers; and a playback-controlling circuit part for using a playback operation at the playback power set by the optical-output-setting circuit part to read optical disc information from the mounted optical-disc recording medium, the optical disc information indicating the type of the mounted optical-disc recording medium.

2. The optical disc device according to claim 1, wherein, when the playback-controlling circuit part has read the optical disc information, the optical-output-setting circuit part switches the playback power of the optical pickup part to a playback power corresponding to the type of the mounted optical-disc recording medium, the type being indicated by the optical disc information.

3. The optical disc device according to claim 2, wherein the optical-output-setting circuit part switches the playback power of the optical pickup part to the playback power corresponding to the type of the mounted optical-disc recording medium, and then adjusts parameters according to the playback power, the type of the optical-disc recording medium being indicated by the optical disc information, and the parameters being the parameters necessary for controlling optical output of the optical pickup part.

4. The optical disc device according claim 1, wherein the mounted optical-disc recording medium is a Blu-ray disc.

5. The optical disc device according claim 2, wherein the mounted optical-disc recording medium is a Blu-ray disc.

6. The optical disc device according claim 3, wherein the mounted optical-disc recording medium is a Blu-ray disc.

7. A method for setting a playback power of an optical disc device, comprising:

a step for performing a focus search on an optical-disc recording medium once the optical-disc recording medium has been mounted in the optical disc device;

a step for determining a type of the mounted optical-disc recording medium on the basis of results of the focus search;

a step for, for setting, when a determination has been made in the determination step that the mounted optical-disc recording medium is a multilayer optical-disc recording medium having three or more recording layers, a playback power for an optical-disc recording medium being of a specification identical to the multilayer optical-disc recording medium and having one or two recording layers; and a step for using a playback operation at the playback power set in the setting step to read optical disc information from the mounted optical-disc recording medium, the optical disc information indicating the type of the mounted optical-disc recording medium.

* * * * *